Aug. 9, 1927.
V. MULHOLLAND
1,638,593
METHOD OF AND APPARATUS FOR CONVEYING PLASTIC GLASS
Filed Aug. 19, 1924     2 Sheets-Sheet 1
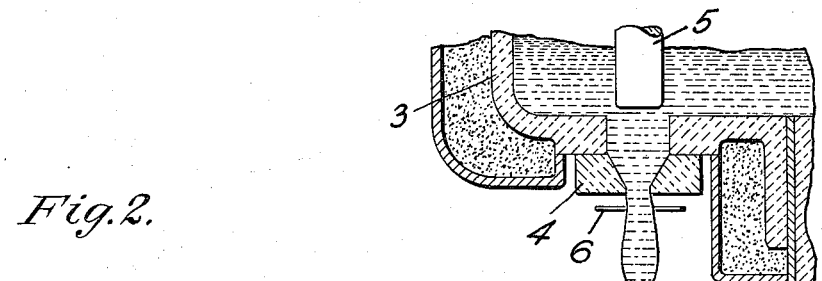
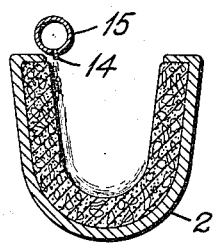
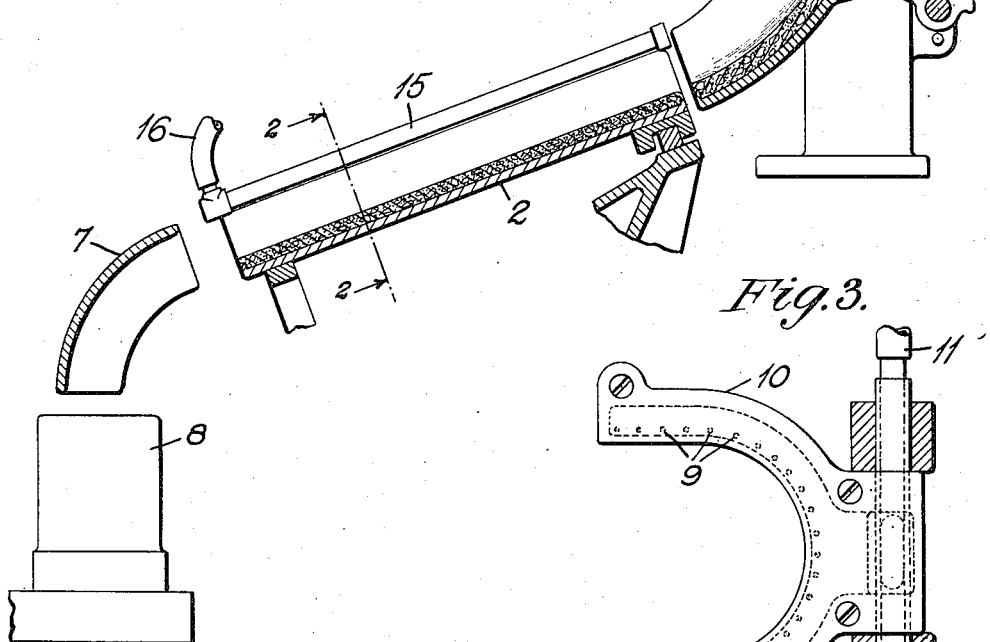
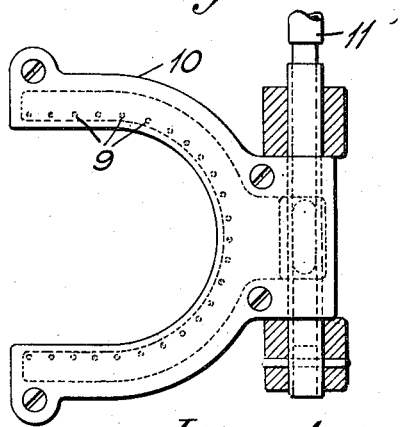
Inventor:
Vergil Mulholland
by W. H. Honiss
Att'y.
Witness:
S. S. Grotta Aug. 9, 1927. 1,638,593
V. MULHOLLAND
METHOD OF AND APPARATUS FOR CONVEYING PLASTIC GLASS
Filed Aug. 19, 1924 2 Sheets-Sheet 2
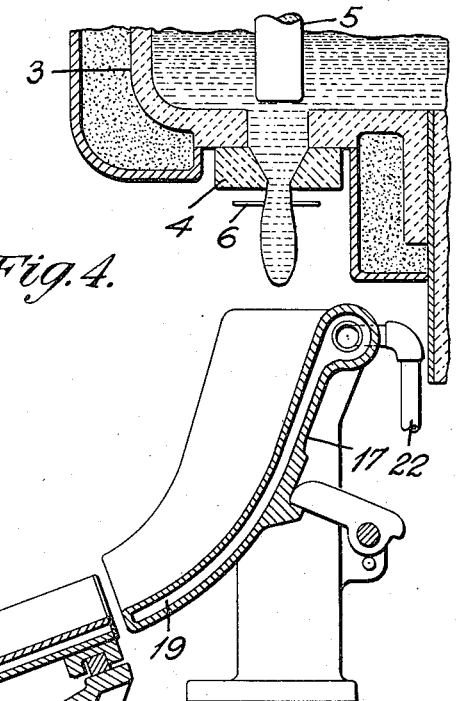
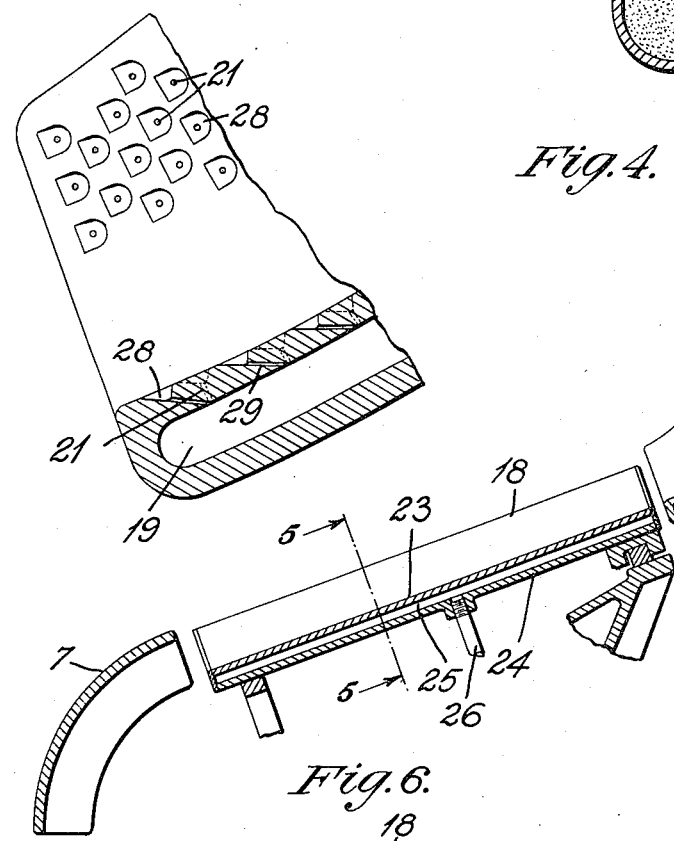
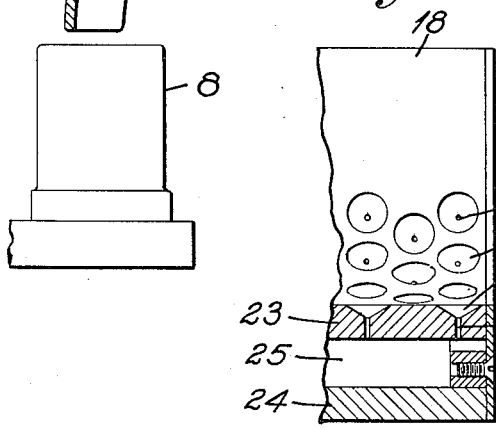
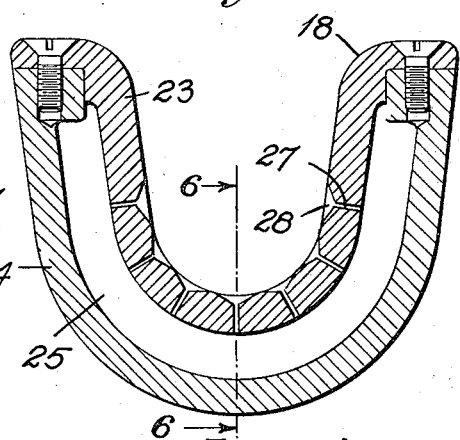
Witness:
J. J. Grotta
Inventor:
Vergil Mulholland
by W. H. Homiss
Atty.

Patented Aug. 9, 1927.

1,638,593

UNITED STATES PATENT OFFICE.

VERGIL MULHOLLAND, OF WEST HARTFORD, CONNECTICUT, ASSIGNOR TO HARTFORD-EMPIRE COMPANY, OF HARTFORD, CONNECTICUT, A CORPORATION OF DELAWARE.

METHOD OF AND APPARATUS FOR CONVEYING PLASTIC GLASS.

Application filed August 19, 1924. Serial No. 732,896.

The invention relates to glass feeding apparatus and it has particular relation to a method of and apparatus for conveying plastic glass in the form of several mold charges from a feeding device to a shaping machine.

One of the objects of the invention is to provide a method of conveying plastic glass with a minimum chill which consists of lubricating the surface of a guideway, such as an inclined delivery trough, and preventing or minimizing contact between glass and guideway by means of air or other gas under pressure and sliding a body of glass in a molten condition along the gaseous film thus provided.

Another object of the invention is to provide a method, such as that described, which includes the feature of so projecting a current of air or other gas under pressure in a direction transverse to that of the travel of a mold charge along a guideway as to cause the charge to rotate during its passage therealong and thereby subject it to uniform thermal treatment from all sides.

A further object of the invention is to provide an apparatus, such as that described, embodying means for projecting gas under pressure adjacent to the conducting surface of a guideway for charges of molten glass to lubricate such surface by providing a gaseous film or cushion to minimize contact therewith and to avoid friction as far as possible; also to provide and direct a current of gas to assist in propelling the charge along the trough.

Still further objects of the invention include such novel features of construction and arrangement as are disclosed in the accompanying specification and drawings; in which Figure 1 is a sectional elevational view through a guideway or delivery trough embodying the present invention;

Fig. 2 is an enlarged sectional elevational view taken on line 2—2 of Fig. 1;

Fig. 3 is an enlarged plan view of the fluid pressure chamber which is shown in Fig. 1 and which distributes the gaseous film over the surface of the deflector;

Fig. 4 is a sectional elevational view through a delivery trough embodying a modified form of the invention;

Fig. 5 is an enlarged sectional elevational view taken on line 5—5 of Fig. 4;

Fig. 6 is an enlarged sectional elevational view taken on line 6—6 of Fig. 5; and Fig. 7 is a similar view showing a still further embodiment of the invention.

A guideway embodying the present invention is illustrated as comprising a laterally movable deflector 1 and a cooperating inclined delivery trough or chute 2. The deflector 1 is disposed beneath the feeding outlet of any suitable glass feeding device which is adapted to deliver successive mold charges of predetermined size and shape for transmission to the molds of a ware shaping machine. Such a feeding device is illustrated as comprising a forehearth 3 for containing a body of molten glass and having a feeding orifice 4 in the bottom thereof. The flow of glass through the orifice 4 is regulated by means of a vertically movable plunger 5. As the glass issues from the orifice it is severed by a shearing device 6 to form successive mold charges of the desired type, which fall into the deflector 1 and are directed thereby into the trough 2. Each of the mold charges gravitates through this trough and as it emerges therefrom it encounters a deflector 7 which directs it downwardly into an awaiting mold 8 of a shaping machine.

In order to facilitate the passage of the mold charges through the deflector 1 and the delivery trough 2 with minimum friction and to minimize any chilling contact of the charges, the surfaces of these elements are provided with a lubricating film of air or other gas under pressure. In the structure shown in Figs. 1, 2 and 3, such a film is obtained by projecting jets of air or other gas through apertures 9 provided in a fluid pressure chamber 10 which is disposed adjacent to the upper portion of the deflector 1 and which is supplied with air under pressure through an inlet pipe 11. The chamber 10 may be of semi-circular or arcuate configuration as shown, or may be annular if desired, in which case it may function as a funnel. The chamber 10 is mounted on the upper edge of the deflector 1 with the apertures 9 in such position as to project the jets of air longitudinally along the side walls and bottom portions of both the deflector 1 and the trough 2 to assist in propelling the mold charges along these elements and to form a lubricating and cushioning film upon which they may freely slide.

This gaseous film may also be supplied, as in trough 2 by means of jets of air which are projected transversely over the surface through apertures 14 (Fig. 2) provided in a longitudinally extending fluid pressure pipe or chamber 15 which is mounted adjacent to one of the side walls of the trough 2 and which is supplied with air or gas under pressure by a pipe 16. The air issuing from the apertures 14 impinges tangentially upon the surface of the mold charges as they successively gravitate along the trough 2. This tends to impart a rotative movement to such charges, depending on the velocity of the air jets. The rotation of the mold charges brings all of the area of their sides equally into contact with the gaseous film and insures an outer surface or skin of uniform temperature.

In the structure shown in Figs. 4 to 7 inclusive, the guideway consists of a deflector 17 and a trough 18. The deflector 17 is of hollow construction to provide a fluid pressure chamber 19 co-extensive with its length and width, which communicates with the atmosphere through apertures 21 and which is supplied with air or gas under pressure from a pipe 22. The trough 18 is also of hollow construction, preferably consisting of upper and lower channel members 23 and 24 secured together in spaced relation with a fluid pressure chamber 25 therebetween, which is substantially co-extensive with the area of the trough. The chamber 25 is supplied with fluid under pressure, such as air or other gas, by a pipe 26, and communicates with the atmosphere through apertures 27 provided in the channel 23. The apertures 21 and 27 in the deflector 17 and trough 18 respectively, preferably communicate directly with recesses 28 which are provided in the bottom portions and the side walls of these elements. The recesses 28 are formed with inclined walls in order to direct and distribute the air issuing therefrom in a substantially uniform film over the guiding surfaces of the deflector and trough, and may be made by counter-sinking the apertures, as illustrated in Figs. 5 and 6. A mold charge as it passes along the deflector and trough momentarily obstructs the flow of air through successive apertures, and causes a pressure to build up in the recesses 28 to form air cushions which support the mold charge and facilitate its passage along these elements without contact with them.

In some instances it is desirable to so incline the walls of the recesses 28 as to direct the air in the general direction of travel of the mold charges along the deflector and the trough, as illustrated in Fig. 7. In such a construction the air not only forms a lubricating film or cushion upon which the mold charges are supported and may slide, but the flow of air through the apertures aids the downward travel of the charges. The air may be heated, or burning gases may be employed instead of air to prevent chill.

In order to obtain the maximum propelling effect of the air, it is desirable in some cases, to provide angularly disposed air ports 29 in the trough. (Fig. 7.) These ports are drilled in the side walls and bottom portion of the trough at an acute angle thereto and are adapted to project a propelling current of air directly back of the mold charges as they gravitate along the trough and impart to them an additional impetus. A trough may be provided entirely with the vertical ports 21 or entirely with the angular ports 29 or it may be provided with both vertical and angular ports so arranged as to obtain the desired results.

By applying a positive propelling force longitudinally of the trough, as hereinbefore described, a trough of less inclination may be employed and mold charges may be conveyed therealong with greater rapidity and accuracy in time of delivery to the molds than when gravity alone is relied upon as the impelling force.

The particular embodiments of the invention illustrated and described have been selected by way of example only, and it is to be understood that various modifications, arrangements and combinations may be employed in fulfilling the spirit of the invention, as defined in the appended claims.

I claim as my invention:

1. The method of conveying molten glass from a feeder to a shaping machine, which comprises depositing the glass on a guideway and admitting gas under pressure to the surface of the guideway to lubricate the same and exert a propelling force on the glass during its passage along the guideway.

2. The method of conveying molten glass to a shaping which comprises directing a stream of gas under pressure along the surface of a guideway for molten glass, to deposit thereon a gaseous film moving in the same direction as that in which the glass is to move in the guideway, and sliding a body of plastic glass over the gaseous film thus formed.

3. The method of conveying molten glass to a shaping machine which comprises directing a stream of gas under pressure transversely of a guideway to lubricate the surface thereof and to cause the rotation of a body of molten glass passing along said guideway.

4. The method of conveying molten glass through a guideway having apertures in the bottom thereof, which comprises passing the glass along the guideway and directing a stream of gas under pressure through the apertures to lubricate the surface and produce a propelling effect on the glass to facilitate its passage along the guideway.

5. The method of conveying molten glass to a shaping machine which comprises directing a stream of gas under pressure longitudinally along a guideway to lubricate the surface thereof, sliding a body of plastic glass over the gaseous film thus formed and directing a stream of gas under pressure tangentially to said body to cause the rotation thereof.

6. An apparatus for conveying molten glass comprising a guideway, and means for directing gas under pressure along and substantially parallel to the surface thereof to provide a gaseous film for facilitating the passage of a body of plastic glass along said guideway.

7. An apparatus for conveying mold charges of molten glass comprising a guideway, and means for directing gas under pressure transversely of said guideway to lubricate the surface thereof and to cause the rotation of a body of plastic glass passing along said guideway.

8. An apparatus for conveying mold charges of molten glass, comprising a guideway, and means for directing gas under pressure along the guideway, said guideway being provided with apertures adapted to direct said gas along the surface of the guideway for facilitating the passage of mold charges along said guideway.

9. An apparatus for conveying molten glass comprising a guideway, means for directing gas under pressure longitudinally along said guideway to lubricate the surface thereof, and means for directing gas under pressure transversely of said guideway to cause the rotation of a body of plastic glass passing therealong.

10. An apparatus for conveying molten glass comprising a guideway, and a fluid pressure chamber located adjacent to said guideway and having perforations therein adapted to direct fluid under pressure into said guideway so as to provide a lubricating film adjacent to the surface thereof and to exert a propelling force on the glass during its passage along said guideway.

11. An apparatus for conveying molten glass comprising a guideway, and a fluid pressure chamber located adjacent to said guideway and having perforations therein adapted to direct fluid under pressure along said guideway in substantially the same direction as that in which the molten glass is to move in said guideway, to provide a lubricating film adjacent to the surface thereof for facilitating the passage of a plastic body of glass along said guideway.

12. An apparatus for conveying mold charges of molten glass comprising a guideway, and a fluid pressure chamber located adjacent to said guideway and having perforations therein adapted to direct fluid under pressure substantially transversely of said guideway to provide a lubricating film adjacent to the surface thereof and for exerting a propelling force on the charges during their passage along said guideway.

13. An apparatus for conveying molten glass comprising a guideway, and a fluid pressure chamber located adjacent to said guideway and having perforations therein adapted to direct fluid under pressure tangentially to a body of plastic glass passing along said guideway to cause the rotation thereof.

14. An apparatus for conveying molten glass, comprising a guideway having recesses provided in the bottom portion thereof, a fluid pressure chamber having passageways communicating with said recesses, said recesses having an area greater than the cross-sectional area of said passageways, and adapted to be successively closed by a body of plastic glass passing along said guideway, whereby a fluid pressure will build up in said recesses and facilitate the passage of said body along said guideway.

15. The method of conveying mold charges to a shaping machine, which consists in depositing a mold charge upon a guideway and directing a current of fluid under pressure against said mold charge to propel it along said guideway.

16. The method of conveying mold charges to a shaping machine, which consists in depositing a mold charge upon a guideway and directing a current of fluid under pressure adjacent to the surface of the guideway to propel the charge therealong.

17. The method of feeding molten glass to a shaping machine, which consists in depositing a mold charge upon a guideway and directing a current of fluid under pressure longitudinally of the guideway to propel the charge therealong.

18. The method of conveying molten glass to a shaping machine, which consists in depositing a mold charge upon a guideway and directing a current of fluid under pressure longitudinally of the guideway to lubricate the surface thereof and to propel the charge therealong.

19. An apparatus for conveying molten glass to a shaping machine, comprising a guideway, and means for directing fluid under pressure along the surface thereof in substantially the same direction as that in which the molten glass is to move in said guideway, so as to propel a body of glass therealong.

20. An apparatus for conveying molten glass to a shaping machine, comprising a guideway, and means for directing fluid under pressure longitudinally thereof to propel a body of glass therealong.

21. An apparatus for conveying molten glass to a shaping machine, which comprises a guideway, and means for directing fluid under pressure longitudinally of the guideway to provide a gaseous film to lubricate the surface thereof and to propel a body of plastic glass along said guideway.

22. An apparatus for conveying molten glass, comprising an inclined trough adapted to receive mold charges and convey them under the action of gravity to a shaping machine, and a fluid pressure chamber, having apertures therein, disposed adjacent to the upper end of said trough and adapted to project a current of fluid under pressure longitudinally of said trough to assist in propelling mold charges therealong.

Signed at Hartford, Connecticut, this 5th day of August, 1924.

VERGIL MULHOLLAND.